(12) United States Patent
Smith

(10) Patent No.: US 6,329,947 B2
(45) Date of Patent: *Dec. 11, 2001

(54) SYSTEM FOR PROCESSING DIRECTIONAL SIGNALS

(76) Inventor: Mark D. Smith, 5341 W. Piute, Glendale, AZ (US) 85308

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,477

(22) Filed: Oct. 12, 1999

(51) Int. Cl.$^7$ ....................................................... G01S 3/52
(52) U.S. Cl. ................................................ 342/418; 342/417
(58) Field of Search ............................... 342/25, 418, 417, 342/424, 457, 451, 462

(56) References Cited

U.S. PATENT DOCUMENTS

| | | | |
|---|---|---|---|
| 3,720,945 | * | 3/1973 | Chow et al. ........................ 343/114.5 |
| 4,067,014 | * | 1/1978 | Wheeler et al. ................ 343/113 DE |
| 4,929,958 | | 5/1990 | Hodel et al. . |
| 5,191,349 | | 3/1993 | Dinsmore et al. . |
| 5,218,360 | | 6/1993 | Goetz et al. . |
| 5,541,608 | * | 7/1996 | Murphy et al. ....................... 342/442 |
| 5,731,783 | * | 3/1998 | Graham ................................. 342/188 |
| 5,805,111 | | 9/1998 | Brettner, III et al. . |

OTHER PUBLICATIONS

Sampath, K. S. et al., "Analysis and simulation of collision avoidance TCAS antennas mounted on aircraft", Proceedings of the Antennas and Propagation Society Annual Meeting, US New York, IEEE, 1991, pp. 948–951, XP000239781 ISBN:0–7803–0144–7.

* cited by examiner

*Primary Examiner*—Dao Phan

(57) ABSTRACT

A system for calculating the bearing of a signal source, with a directional antenna, provides corrections for distortion, such as due to a small fuselage of the monitoring aircraft and the elevation angle of an intruder aircraft with respect to the monitoring aircraft. A correction is applied to the bearing estimate that is based on relevant factors, such as the fuselage size and the elevation angle of the intruder aircraft. The correction can be calculated or applied through the use of a look-up table, which may be either pre-selected or selected after calculation of the elevation angle of the intruder aircraft.

57 Claims, 8 Drawing Sheets

| QUADRANT OF STRONGEST BEAM | QUADRANT OF 2ND STRONGEST BEAM | CARDINAL ANGLE | SIGN | PRIMARY CROSSOVER SPACING DIVIDED BY 2 | RATIO |
|---|---|---|---|---|---|
| FORE | STARBOARD | 0 DEGREES | −1 | 40 DEGREES | <u>40 DEGREES</u><br>11 dB |
| FORE | PORT | 0 DEGREES | +1 | 40 DEGREES | <u>40 DEGREES</u><br>11 dB |
| PORT | FORE | 270 DEGREES | −1 | 50 DEGREES | <u>50 DEGREES</u><br>13 dB |
| PORT | AFT | 270 DEGREES | +1 | 50 DEGREES | <u>50 DEGREES</u><br>13 dB |
| AFT | PORT | 180 DEGREES | −1 | 40 DEGREES | <u>40 DEGREES</u><br>11 dB |
| AFT | STARBOARD | 180 DEGREES | +1 | 40 DEGREES | <u>40 DEGREES</u><br>11 dB |
| STARBOARD | AFT | 90 DEGREES | −1 | 50 DEGREES | <u>50 DEGREES</u><br>13 dB |
| STARBOARD | FORE | 90 DEGREES | +1 | 50 DEGREES | <u>50 DEGREES</u><br>13 dB |

FIG. 8

SYSTEM FOR PROCESSING DIRECTIONAL SIGNALS

BACKGROUND

1. Field of the Invention

The present invention generally relates to processing signals received with a directional antenna, and more particularly, to identifying the bearing of a signal source based on signals received with a directional antenna.

2. Description of the Related Art

As technology in air transportation has evolved, the demands on the members of the flight deck have become increasingly severe. To avoid flight path conflicts, the flight deck crew monitors considerable aircraft status information for multiple surrounding aircraft at a time when air traffic is dramatically increasing. Higher aircraft speeds magnify the burden by reducing the time in which the flight deck crew can respond to threatening situations.

To assist the flight deck crew and enhance safety, several systems have been and are being developed. Many aircraft carry transponders (e.g., mode S, mode C, mode A) by which one aircraft can communicate to a second aircraft both its identity and various flight parameters. Typically, a monitoring aircraft transmits a signal in a predetermined format which, upon receipt by an intruding aircraft, causes the intruding aircraft to respond with a transmission which includes information in a predetermined format. Systems generally referred to as traffic alert and collision avoidance systems (TCAS) process information received from intruder aircraft along with the status parameters of the receiving aircraft to identify potential collision situations. A TCAS also typically provides the flight deck crew with advisory information suggesting an action to avoid the collision situation.

A TCAS typically includes a directional antenna. The TCAS uses the directional antenna to determine the bearing of an intruder aircraft relative to the TCAS equipped monitoring aircraft. When receiving signals from the intruder aircraft, TCAS processes the signals to calculate an estimated bearing for the intruder aircraft, and this information is displayed to the flight deck crew to assist them in obtaining visual contact with the intruder aircraft.

One approach used by TCAS systems is to estimate an intruder aircraft's bearing by comparing magnitudes of signals received by the components of the directional antenna. FIG. 1 illustrates the radiation pattern of signals received by a typical directional antenna having four antenna elements measured on a test four foot diameter flat ground plane. This radiation pattern simulates the performance of the antenna on a large transport aircraft, such as an aircraft having a fuselage curvature radius greater than 80 inches. The performance of the antenna beams in each of the four quadrants representing port, starboard, fore and aft, is virtually identical. To estimate the bearing of an intruder aircraft, conventional TCAS uses a model based on the radiation pattern measured on the test ground plane, such as the radiation pattern illustrated in FIG. 1. An exemplary model used by a conventional TCAS signal processing scheme is illustrated in FIG. 2. When an intruder aircraft is detected, the bearing of the intruder aircraft is calculated by determining which beam (from the four beams representing each of the four quadrants of the polar coordinate system) has the largest amplitude and which beam has the second largest amplitude and then taking the difference between the two. Based on this difference, a bearing estimate can be generated using a conventional TCAS model, such as the model illustrated in FIG. 2.

Various factors, however, may degrade the accuracy of the bearing estimate. For example, monitoring aircraft having small fuselages may detect transponder signals differently than larger aircraft, which may degrade the bearing estimate accuracy. Consequently, the model illustrated in FIG. 2 is not as accurate with aircraft that have small fuselages, such as those aircraft with a radius of fuselage curvature smaller than 64 inches. The smaller fuselage causes a distortion such that the beam peak in the port and starboard directions occurs at a lower elevation angle than the beams of the model illustrated in FIG. 2. This displacement may degrade the accuracy of the bearing estimate. The degradation tends to be more pronounced in aircraft with smaller fuselages than those with a larger fuselage. The amount of the error is also dependent on the elevation angle of the intruder aircraft.

SUMMARY OF THE INVENTION

In accordance with the present invention, a system for calculating a bearing of a signal source, such as an intruder aircraft, using an antenna, such as a directional antenna having a plurality of receiving elements, may include selecting a correction model from a plurality of correction models, wherein the correction model selection may be based on the fuselage radius of the monitoring aircraft or the estimated elevation angle of the intruder aircraft. The monitoring aircraft receives a plurality of incoming signals with the receiving elements and processes the incoming signals to produce a plurality of electrical connection signals, wherein each of the electrical connection signals corresponds to a different quadrant of a polar coordinate system and each of the electrical connection signals has an amplitude. The system selects the electrical connection signals with the strongest amplitude and the second strongest amplitude, calculates an amplitude difference between the two selected signals and applies a correction model to the amplitude difference in order to obtain the bearing of the signal source. The correction model may be pre-selected by the supplier or the operator, or alternatively, the correction model may be automatically selected by the system.

In accordance with an embodiment of the present invention, the correction model may comprise a look-up table.

The correction model is applied to improve the bearing estimate accuracy of the intruder aircraft by, for example, minimizing the distortion caused by the curvature of the monitoring aircraft's fuselage.

BRIEF DESCRIPTION OF THE DRAWINGS

A more complete understanding of the present invention may be derived by referring to the detailed description and claims when considered in connection with the following illustrative Figures, which may not be to scale. In the following Figures, like reference numbers refer to similar elements throughout the Figures.

FIG. 8 illustrates a look-up table of the representative correction model illustrated in FIG. 7 in accordance with one embodiment of the present invention.

DETAILED DESCRIPTION OF EXEMPLARY EMBODIMENTS

A signal processing system according to various aspects of the present invention provides a system for calculating the bearing of a signal source, such as an intruder aircraft, which is adjusted according to various criteria, such as the size of the fuselage of the monitoring aircraft or the relative elevation angle of an intruder aircraft. Although various aspects of the invention may be used in conjunction with a variety of systems that have a directional antenna with a plurality of receiving elements, the present invention is conveniently described below in connection with a TCAS. This exemplary implementation, however, should in no way be construed to limit the applicability of various aspects of the invention in other environments or otherwise limit the claims.

Figure 3:
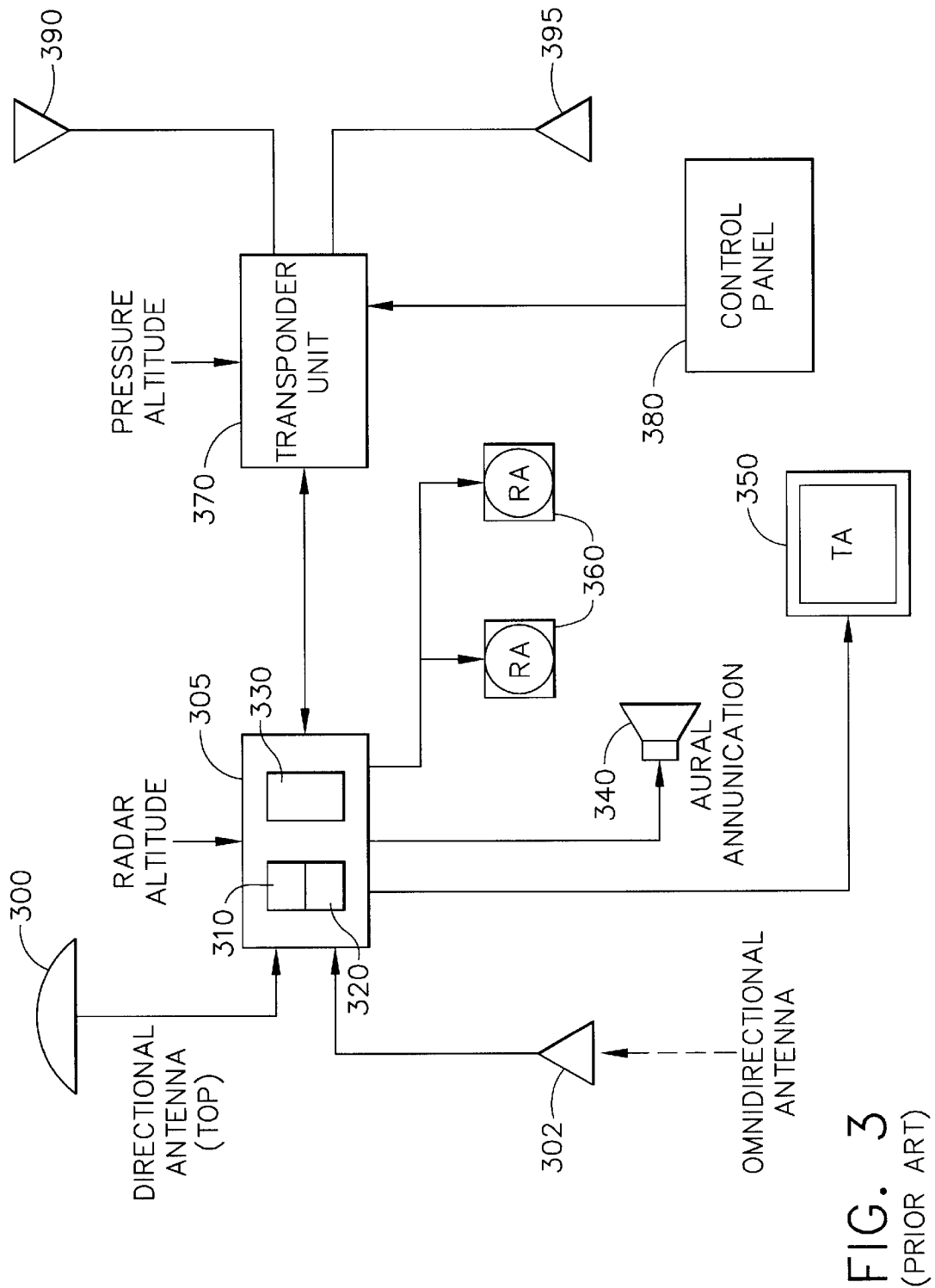
FIG. 3 is a block diagram of a typical TCAS system.

FIG. 3 is a block diagram of a conventional TCAS comprising a TCAS directional antenna 300, a TCAS omni-directional antenna 302, and a TCAS computer unit 305 which includes a receiver 310, a transmitter 320, and a processor 330. The TCAS also includes an aural annunciator 340, a traffic advisory (TA) display 350, and resolution advisory displays 360. A transponder is also shown comprising a transponder unit 370, a control panel 380, and transponder antennas 390 and 395. The TCAS and transponder operate together to function as a collision avoidance system. The present embodiment is merely illustrative of a typical TCAS and many other configurations are possible, such as adding a second directional antenna or utilizing a transceiver.

The operations of the TCAS and each component illustrated in FIG. 3 are well known and therefore will not be described in detail. A general description of TCAS technology, however, is provided in *Introduction to TCAS II* published by the United States Department of Transportation—Federal Aviation Administration.

Figure 4:
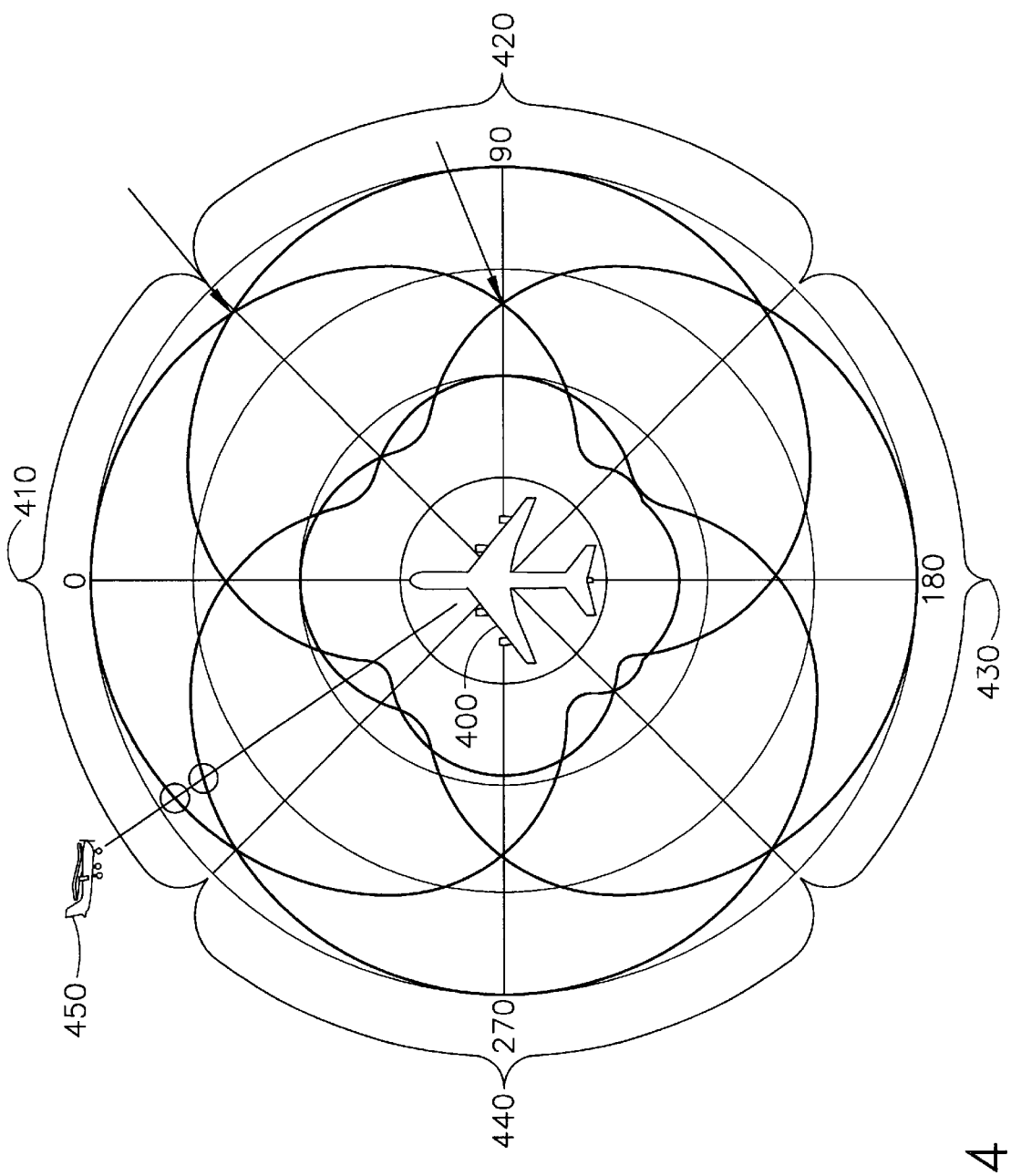
FIG. 4 illustrates the radiation pattern, in polar coordinates, of a typical TCAS directional antenna having four receiving elements.

Referring to FIG. 4, a typical radiation pattern of a TCAS directional antenna having four receiving elements is shown in polar coordinates. The TCAS directional antenna is mounted on a monitoring aircraft 400. The directional antenna of monitoring aircraft 400 receives a plurality of incoming signals on its four antenna elements substantially simultaneously. The incoming signals are processed inside the antenna to produce a plurality of electrical connector signals 505 (shown in FIG. 5), such that each electrical signal 505 represents a unique quadrant of the polar coordinate system. The electrical connector signals 505 in the present embodiment correspond to the four quadrants representing fore 410, starboard 420, aft 430, and port 440. FIG. 4 illustrates the signal amplitude received by each of the four elements from various angles for receiving signals.

Figure 5:
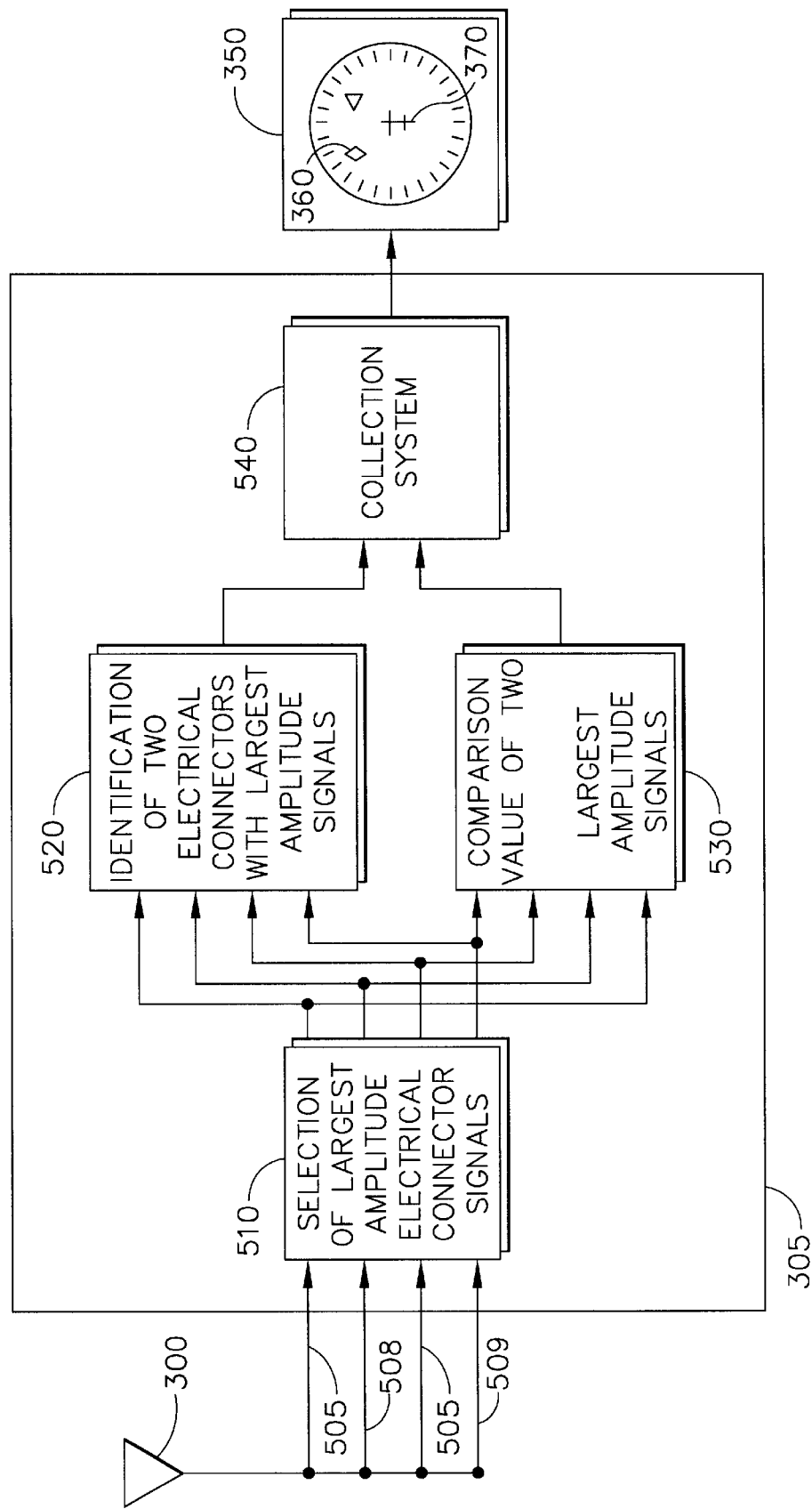
FIG. 5 is a block diagram of the processing system, in the context of the present invention, for calculating the bearing of the source of signals received by a directional antenna.

Referring to FIG. 5, the TCAS computer unit 305 calculates an estimated intruder aircraft bearing based on the intruder's transponder signal. As described above, directional antenna 300, having a plurality of receiving elements, receives the incoming transponder signals. Directional antenna 300 processes the incoming signals and produces electrical connector signals 505 that are routed to TCAS computer unit 305. TCAS computer unit 305 processes signals 505 and produces the bearing estimate of intruder aircraft 450 for display on TA display 350.

More particularly, the signals received by antenna 300 are routed to a selector 510. Selector 510 selects the signal with the strongest amplitude and the signal with the next strongest amplitude. The selected signals from selector 510 are applied to an identifier 520 and to a comparator 530. Identifier 520 identifies the corresponding quadrants (i.e., fore, starboard, aft, or port) for the strongest signal and the second strongest signal selected by selector 510. Comparator 530 compares the amplitudes for each of the two selected signals and calculates an amplitude difference that is the difference between the two amplitude values. The quadrant identification and the amplitude difference of the two selected signals are supplied to correction system 540, which then suitably generates a corrected bearing estimate of intruder aircraft 450. In accordance with various aspects of the present invention, correction system 540 applies a correction to an initial bearing estimate, which is suitably generated in any manner. Typically, the corrected bearing estimate of the intruder aircraft (i.e., intruder aircraft icon 360 on TA display 350) is then shown relative to the monitoring aircraft (i.e., monitoring aircraft icon 370) on TA display 350.

Figure 1:
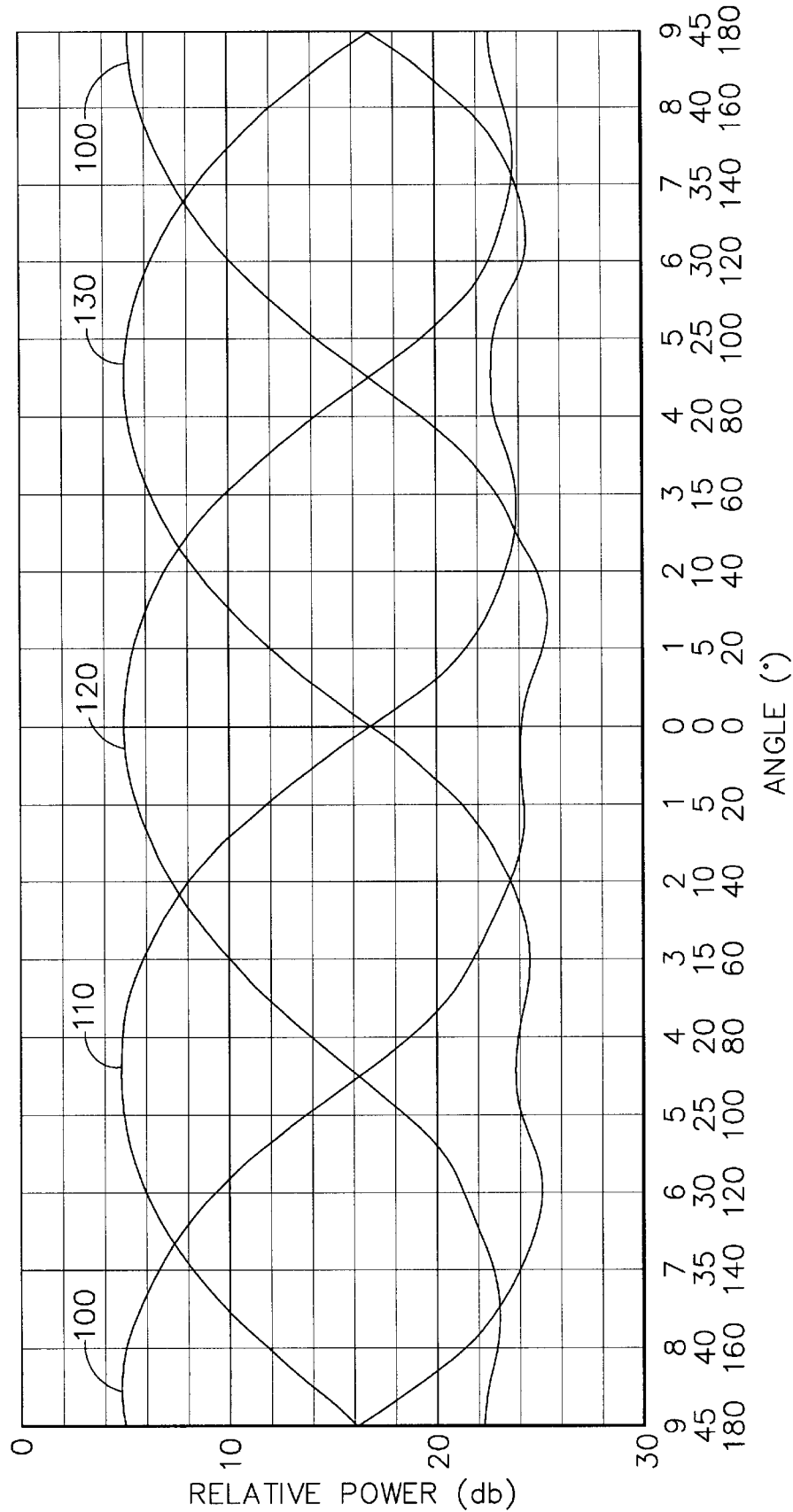
FIG. 1 illustrates the radiation pattern, in rectangular coordinates, of a typical TCAS directional antenna mounted on a standard ground plane.
Figure 2:
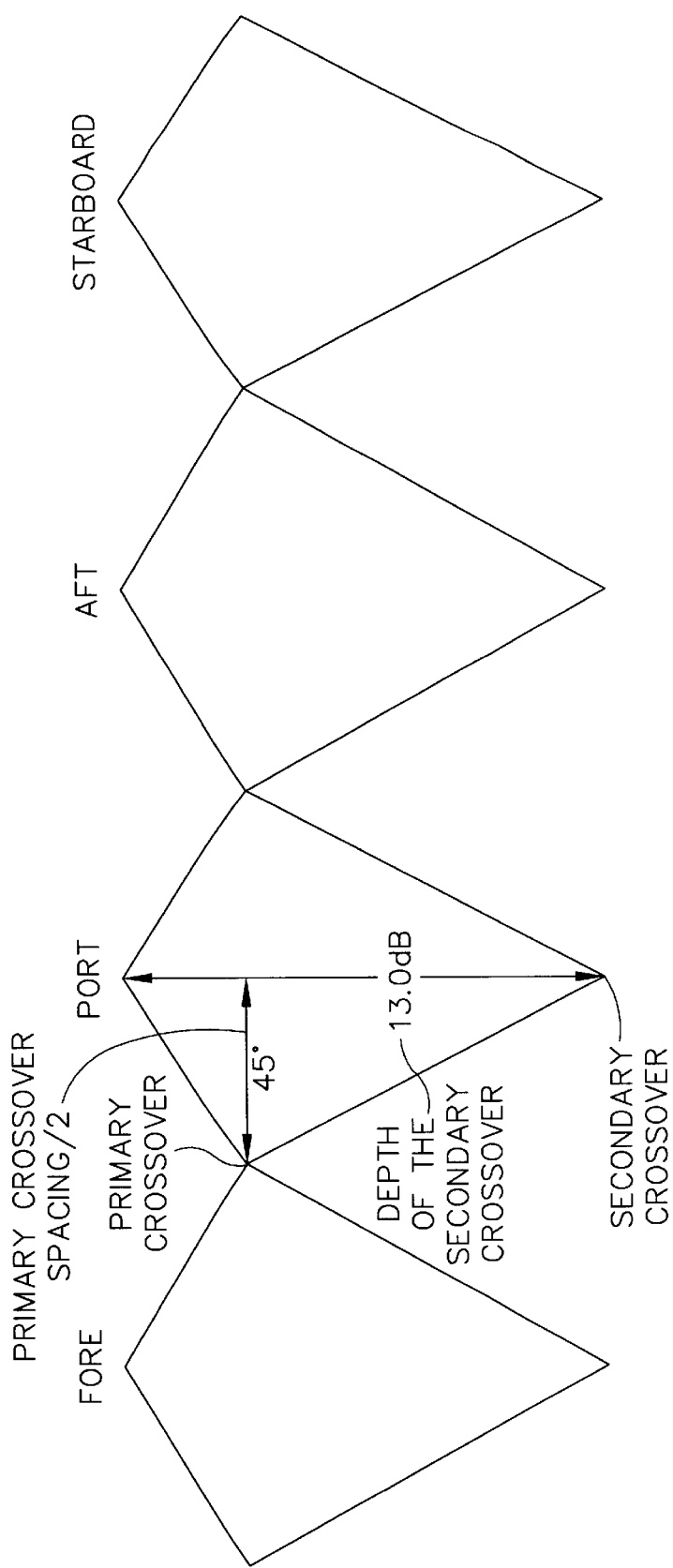
FIG. 2 illustrates the bearing calculation model of a typical TCAS directional antenna.
Figure 6:
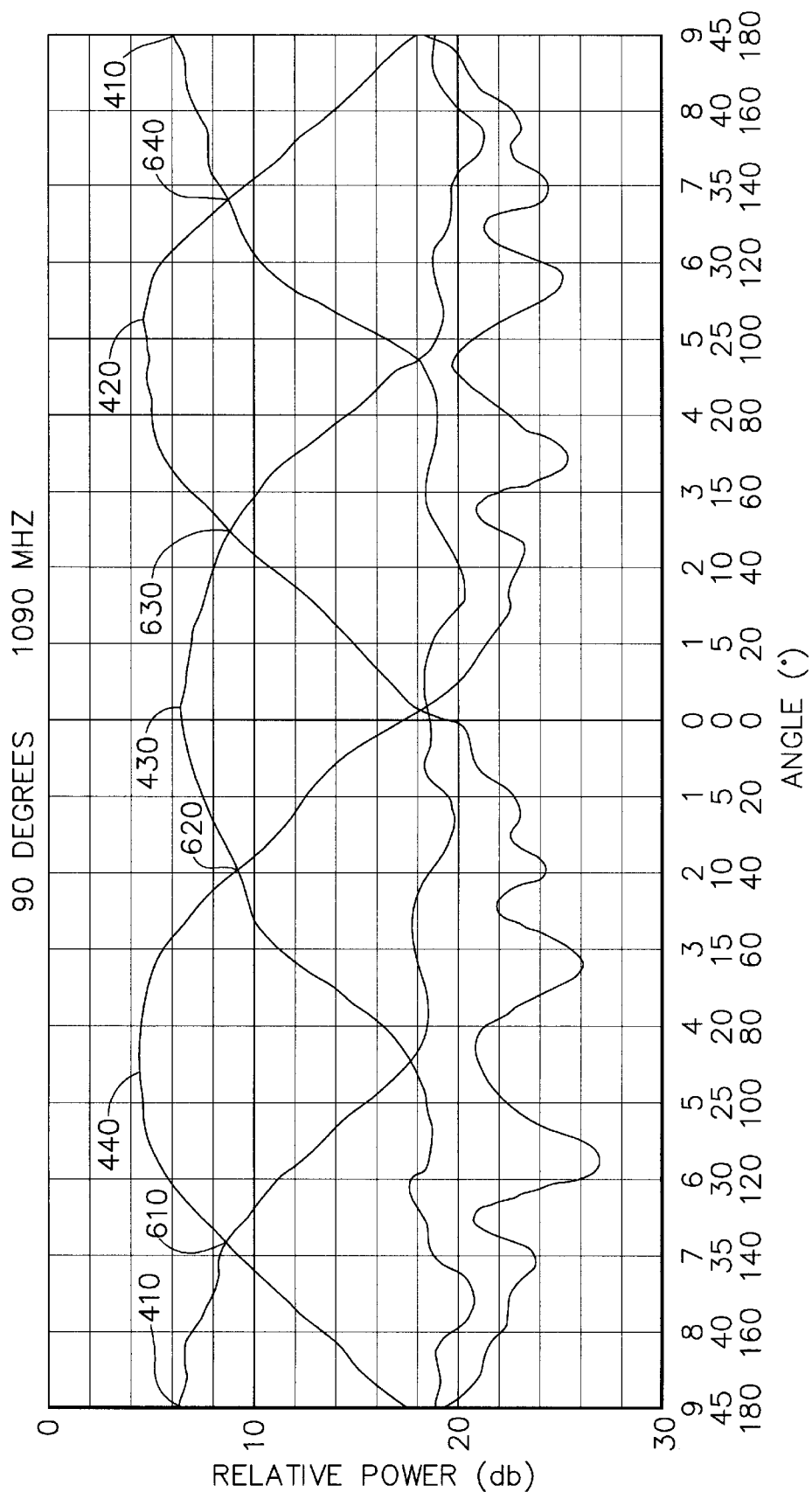
FIG. 6 illustrates the radiation pattern, in rectangular coordinates, of a TCAS directional antenna mounted on an aircraft with a small fuselage.

As illustrated in FIG. 6, the radiation pattern of a directional antenna mounted on an aircraft with a small fuselage, such as a fuselage having a radius of curvature of approximately 64 inches or less, has beam peaks of different amplitudes for each of the four quadrants for a specified elevation angle. The radiation pattern illustrated in FIG. 6 is for an elevation angle of 90 degrees (i.e., horizon). As stated previously, the rounding of the port and starboard sides of the aircraft fuselage has little effect on the fore and aft beams of the directional antenna. However, the beam peaks of the port and starboard beams occur at a lower elevation angle for an antenna mounted on the fuselage than for an antenna mounted on the flat ground plane. Thus, for directional antenna azimuth radiation patterns at lower elevation angles (i.e., near or below the horizon), the port and starboard beams are stronger than the fore and aft beams, creating a radiation pattern similar to that shown in FIG. 6. The reciprocal effect is that at higher elevation angles, the fore and aft beams are stronger than the port and starboard beams. There is a particular elevation angle at which the fore and aft beam peak amplitudes are equal to the port and starboard beam peak amplitudes. At this unique elevation angle, the antenna radiation approximates FIG. 1 very well, but for all other elevation angles, the system based on FIG. 1 inherently contains errors. Since the amplitudes of the beam peaks affect the calculation of the bearing of the intruding aircraft, the correction system 540, according to various aspects of the present invention performs a correction that accounts for the different beam peaks.

Figure 7:
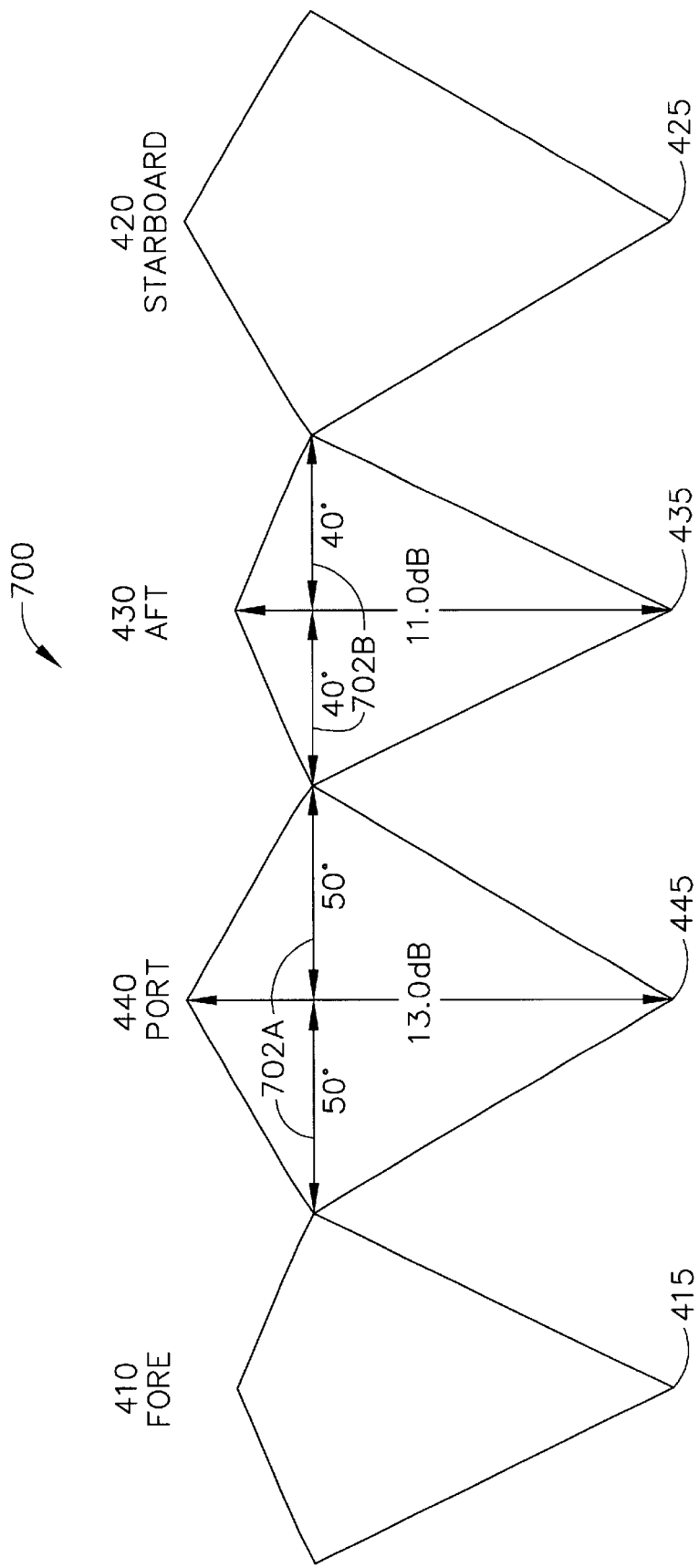
FIG. 7 illustrates a representative correction model of the present invention, for the monitoring aircraft of FIG. 6.

In accordance with the present invention, a correction model, such as the correction model 700 illustrated in FIG. 7, is applied by the correction system 540 to improve the bearing estimate accuracy of the intruder aircraft based on, for example, the size of the monitoring aircraft's fuselage and/or the elevation angle of the intruder aircraft. The specific values of the model suitably vary depending on fuselage size and elevation angle, but the application of the model may remain the same.

In the present embodiment, correction model 700 approximates, in a piece-wise linear pattern, the radiation pattern illustrated in FIG. 6. The model is divided into four quadrants—fore 410, port 440, aft 430, and starboard 420. Each quadrant has a cardinal angle that corresponds to that quadrant's position in the polar coordinate system. Fore 410 has a cardinal angle 415 of 0 degrees. Port 440 has a cardinal angle 445 of 270 degrees. Aft 430 has a cardinal angle 435 of 180 degrees and starboard 420 has a cardinal angle 425 of 90 degrees. In addition, each quadrant has a primary crossover spacing 702A, B that varies depending on any relevant factors, such as the fuselage size and the elevation angle of the intruder aircraft in the present embodiment. The primary crossover spacing for a quadrant is the spacing between the crossovers of the beam for the current quadrant and the beams for the adjacent quadrants. For example, primary crossover spacing 702A for port quadrant 440 illustrated in FIG. 7 is 100 degrees, and primary crossover spacing 702B for aft quadrant 430 is 80 degrees. Similarly, the primary crossover spacing for starboard quadrant 420 is 100 degrees and the primary crossover spacing for fore quadrant 410 is 80 degrees.

Each quadrant of the correction model also has a depth of a secondary crossover. The depth of the secondary crossover for a quadrant is the depth or difference, such as in decibels (dB), between the beam peak of the quadrant and the point at which the beams for the two adjacent quadrants intersect. For example, the depth of the secondary crossover for port quadrant 440 illustrated in FIG. 7 is 13.0 dB, and the depth of aft quadrant 430 is 11.0 dB. Similarly, the depth of starboard quadrant 420 is 13.0 dB, and the depth of fore quadrant 410 is 11.0 dB.

The correction model 700 applied to the bearing estimate of an intruder aircraft, in accordance with various aspects of the present invention, uses the cardinal angle, the primary crossover spacing, and the depth of the secondary crossover, as well as any other suitable criteria, to correct for distortion of the signal. More specifically, in the present embodiment, the correction may be applied in accordance with the following formula:

(cardinal angle)+((sign)*(primary crossover spacing/2))−((amplitude delta)*(sign)*(ratio))=bearing estimate of intruder aircraft in degrees where,
cardinal angle=cardinal angle, in degrees, of the quadrant containing the strongest beam (i.e., highest amplitude), received from the intruder aircraft;
sign=multiplier that determines whether the offset due to the amplitude delta is added or subtracted from the cardinal angle as discussed below;
primary crossover spacing=primary crossover spacing, in degrees, of the quadrant containing the strongest beam;
amplitude delta=difference, in dB, between the amplitudes of the strongest beam, and the next strongest beam of the signals received from the intruder aircraft; and
ratio=(primary crossover spacing/2)/(depth of the secondary crossover), where the primary crossover spacing and the depth of the secondary crossover are for the quadrant containing the strongest beam.

In accordance with one embodiment of the present invention, the correction model can be implemented by a look-up table, such as the look-up table shown in FIG. 8 for the correction model illustrated in FIG. 7. The look-up table is suitably organized by the quadrant of the strongest beam and the quadrant of the next strongest beam. The cardinal angle, primary crossover spacing, sign, and ratio may be stored in the look-up table.

The value for sign is determined in the present embodiment based on an initial bearing estimate using the quadrants of the strongest and the next strongest beam. The only positions on the antenna pattern where the difference between the amplitudes of the strongest and the next strongest beam is known occurs at the primary crossover points where the differences are zero (e.g., primary crossover points 610, 620, 630 and 640 in FIG. 6). The formula uses these points as anchor points. Depending on which half of the quadrant in which the intruder is located according to the initially estimate bearing, the formula either subtracts a fixed offset (i.e., primary crossover spacing divided by 2) while adding the variable offset (i.e., amplitude delta*ratio) or the formula adds the fixed offset while subtracting the variable offset.

The look-up table is suitably pre-calculated to provide cardinal angle, sign, primary spacing, and ratio, for various elevation angles and various fuselage sizes. The operator of the monitoring aircraft may preselect the look-up table, from a plurality of look-up tables, based on the fuselage size of the monitoring aircraft. Alternatively, the TCAS may automatically select an appropriate look-up table, for example upon entry of the aircraft model number. In addition, since air traffic is heaviest at the horizon, the supplier or operator may pre-select a look-up table for the horizon (i.e., elevation angle of 90 degrees), so that the bearing estimate would be more accurate for the greatest number of intruder aircraft. Alternatively, the look-up table may be selected for any suitable elevation angle. In this embodiment, the correction applied would be dependent only on the fuselage size.

The radiation pattern illustrated in FIG. 6 is for an elevation angle of 90 degrees (i.e., horizon). The values of the beam peaks, and therefore the characteristics of an appropriate correction model 700, tend to differ depending on the elevation angle of the intruder aircraft as well as the radius of curvature of the monitoring aircraft's fuselage.

In accordance with another embodiment of the present invention, the correction model may be applied by automatically selecting a look-up table based on the elevation angle of the intruder aircraft. A plurality of look-up tables for different fuselage sizes and for different elevation angles may be pre-calculated. The correct look-up table is suitably selected after calculating the elevation angle of the intruder aircraft. This selection may also be based on the fuselage size of the monitoring aircraft. For example, the elevation angle of the intruder aircraft may be calculated using altitude information available in the incoming signals from the intruder aircraft and the distance to the intruder aircraft. This distance may be determined in any manner, such as the duration of the delay between a transmitted signal and response from the intruder aircraft.

The present invention has been described above with reference to a preferred embodiment. However, those skilled in the art having read this disclosure will recognize that changes and modifications may be made to the preferred embodiment without departing from the scope of the present invention. For example, instead of applying the correction model by a look-up table, the correction model could be applied by a mathematical formula that varies the correction depending on stored correction values for different fuselage sizes and elevation angles. These and other changes or modifications are intended to be included within the scope of the present invention, as expressed in the following claims.

What is claimed is:

1. A method for calculating a bearing of a signal source using a directional antenna having a plurality of receiving elements, comprising the steps of:

selecting a correction model from a plurality of correction models;

receiving a plurality of incoming signals with the receiving elements;

processing the incoming signals to produce a plurality of electrical connection signals, wherein each of the electrical connection signals corresponds to a different quadrant of a polar coordinate system and each of the electrical connection signals has an amplitude;

selecting the electrical connection signal with the strongest amplitude;

selecting the electrical connection signal with the second strongest amplitude;

identifying a first quadrant that contains the electrical connection signal with the strongest amplitude;

identifying a second quadrant that contains the electrical connection signal with the second strongest amplitude;

calculating an amplitude difference between the electrical connection signal with the strongest amplitude and the electrical connection signal with the second strongest amplitude;

applying a correction to the amplitude difference in order to obtain the bearing of the signal source, wherein the correction is determined by the correction model, the first quadrant, and the second quadrant.

2. The method according to claim 1, wherein the correction model comprises a look-up table.

3. The method according to claim 1, wherein the signal source comprises an intruder aircraft.

4. A method for calculating a bearing of a signal source using a directional antenna having a plurality of receiving elements, comprising the steps of:

receiving a plurality of incoming signals with the receiving elements;

processing the incoming signals to produce a plurality of electrical connection signals, wherein each of the electrical connection signals corresponds to a different quadrant of a polar coordinate system and each of the electrical connection signals has an amplitude;

selecting the electrical connection signal with the strongest amplitude;

selecting the electrical connection signal with the second strongest amplitude;

identifying a first quadrant that contains the electrical connection signal with the strongest amplitude;

identifying a second quadrant that contains the electrical connection signal with the second strongest amplitude;

calculating an amplitude difference between the electrical connection signal with the strongest amplitude and the electrical connection signal with the second strongest amplitude;

calculating an elevation angle of the signal source;

selecting a correction model from a plurality of correction models based on the elevation angle;

applying a correction to the amplitude difference in order to obtain the bearing of the signal source, wherein the correction is determined by the correction model, the first quadrant, and the second quadrant.

5. The method according to claim 4, wherein the selecting step of selecting a model further comprises selecting the correction model based on a fuselage size of a monitoring aircraft.

6. A system for determining a bearing to a radio signal source, the system comprising:

a. a first antenna having a maximum sensitivity in a first direction and providing in response to the signal source a first signal having a first amplitude, the first antenna being associated with a first ground plane;

b. a second antenna a having a maximum sensitivity in a second direction different from the first direction and providing in response to the signal source a second signal having a second amplitude, the second antenna being associated with a second ground plane;

c. a third antenna having a maximum sensitivity in a third direction different from the first direction and different from the second direction, and providing in response to the signal source a third signal having a third amplitude, the third antenna being associated with a third ground plane; and d. a computer coupled to the first, second, and third antennas that determines a largest amplitude signal and a next-largest amplitude signal selected in response to the first, second, and third signals; determines a difference between the largest amplitude signal and the next-largest amplitude signal; and determines the bearing in accordance with a linear function of the difference, wherein the linear function has a slope in accordance with a difference between the respective ground planes associated with the largest amplitude signal and the next-largest amplitude signal.

7. The system of claim 6 wherein the first, second, and third antenna are mounted on a fuselage and the difference between the ground planes corresponds to a respective curvature of the fuselage along the respective direction.

8. The system of claim 6 wherein two of the respective ground planes are effectively the same.

9. The system of claim 6 wherein the computer determines the bearing in accordance with instructions that implement the linear function as a formula.

10. The system of claim 6 wherein:
a. the computer comprises a look-up table; and
b. the look-up table comprises precalculated indicia of the linear function.

11. The system of claim 10 wherein the look-up table provides precalculated indicia of the linear function as indexed by the amplitude difference.

12. The system of claim 10 wherein the look-up table comprises:
a. first precalculated indicia of the linear function in accordance with a first slope, the first slope being in accordance with a first difference between the first ground plane and the second ground plane; and
b. second precalculated indicia of the linear function in accordance with a second slope, the second slope being in accordance with a second difference between the second ground plane and the third ground plane.

13. The system of claim 6 wherein:
a the computer comprises indicia of a plurality of slopes for determining the bearing; and
b. the computer is responsive to an input of the system to operate with a designated slope.

14. The system of claim 13 wherein the computer is responsive to the input upon association of the system with a particular fuselage.

15. The system of clam 13 wherein the computer is responsive to the input from time to time during operation of the system.

16. The system of claim 13 wherein the indicia of the plurality of slopes comprises precalculated indicia of the linear function employing each slope of the plurality.

17. The system of claim 6 wherein:
a. the computer comprises indicia of a multiplicity of slopes, each slope for determining the bearing; and
b. the computer is responsive to an input of the system to operate with a designated plurality of slopes of the multiplicity.

18. The system of claim 17 wherein the computer is responsive to the input upon association of the system with a particular fuselage.

19. The system of claim 17 wherein the computer is responsive to the input from time to time during operation of the system.

20. The system of claim 17 wherein the designated plurality comprises indicia of slope in accordance with an elevation angle of horizon.

21. A system for determining a bearing to a radio signal source, the system comprising:
a. a first antenna having a maximum sensitivity in a first direction and providing in response to the signal source a first signal having a first amplitude, the first antenna being associated with a first ground plane;
b. a second antenna having a maximum sensitivity in a second direction different from the first direction and providing in response to the signal source a second signal having a second amplitude, the second antenna being associated with a second ground plane;
c. a third antenna having a maximum sensitivity in a third direction different from the first direction and different from the second direction, and providing in response to the signal source a third signal having a third amplitude, the third antenna being associated with a third ground plane;
d. a ranging subsystem that determines a range to the signal source;
e. an altitude subsystem that determines an altitude of the system and an altitude of the signal source; and
f. a computer coupled to the first, second, and third antennas that determines a largest amplitude signal and a next-largest arm amplitude signal selected in response to the first, second, and third signals; determines an amplitude difference between the largest amplitude signal and the next-largest amplitude signal; determines an elevation angle of the signal source in accordance with the range to the signal source, the altitude of the system, and the altitude of the signal source; and determines the bearing in accordance with a linger function of the amplitude difference, wherein the linear function has a slope in accordance with the elevation angle and in accordance with a difference between the respective ground planes associated with the largest amplitude signal and the next-largest amplitude signal.

22. The system of claim 21 wherein the altitude subsystem determines the altitude of the signal source in accordance with indicia of altitude provided by a transmission from the signal source.

23. The system of claim 21 wherein the first, second, and third antenna are mounted on a fuselage and the difference between the ground planes corresponds to a respective curvature of the fuselage along the respective direction.

24. The system of claim 21 wherein two of the respective ground planes are effectively the same.

25. The system of claim 21 wherein the computer determines the bearing in accordance with instructions that implement the linear function as a formula.

26. The system of claim 21 wherein:
a. the computer comprises a look-up table; and
b. the look-up table comprises precalculated indicia of the linear function.

27. The system of claim 26 wherein the look-up table provides precalculated indicia of the linear function as indexed by the amplitude difference.

28. The system of claim 26 wherein the look-up table comprises;
a. first precalculated indicia of the linear function in accordance with a first slope, the first slope being in accordance with a first difference between the first ground plane and the second ground plane; and
b. second precalculated indicia of the linear function in accordance with a second, the second slope being in accordance with a second difference between the second ground plane and the third ground plane.

29. The system of claim 21 wherein:
a. the computer comprise indicia of a plurality of slopes for determining the bearing; and
b. the computer is responsive to an input of the system to operate with a designated slope.

30. The system of claim 29 wherein the computer is responsive to the input upon association of the system with a particular fuselage.

31. The system of claim 29 wherein the computer is responsive to the input from time to time during operation of the system.

32. The system of claim 29 wherein the indicia of the plurality of slopes comprises precalculated indicia of the linear function employing each slope of the plurality.

33. The system of claim 21 wherein:
a. the computer comprises indicia of a multiplicity of slopes, each slope for effecting a respective linear function for determining the bearing; and
b. the computer is responsive to an input of the system to operate with a designated plurality of slopes of the multiplicity.

34. The system of claim 33 when the computer is responsive to the input upon association of the system with a particular fuselage.

35. The system of claim 33 wherein the computer is responsive to the input from time to time during operation of the system.

36. The system of claim 33 wherein the designated plurality comprises indicia of slope in accordance with an elevation angle of horizon.

37. A system for determining a bearing to a radio signal source, the system comprising;
a. a first antenna having a maximum sensitivity in a first direction and providing in response to the signal source a first signal having a first amplitude;
b. a second antenna having a maximum sensitivity in a second direction different from the firs direction and providing in response to the signal source a second signal having a second amplitude;
c. a ranging subsystem that determines a range to the signal source;
d. an altitude subsystem that determines an altitude of the system and an altitude of the signal source; and
e. a computer coupled to the first and second antennas that determines an amplitude difference between the first amplitude and the second amplitude; determines an elevation angle of the signal source in accordance with the range to the signal source, the altitude of the system, and the altitude of the signal source; and determines the bearing in accordance with a linear function of the amplitude difference, wherein the linear function has a slope in accordance with the elevation angle.

38. The system of claim 37 wherein the computer determines the bearing in accordance with instructions that implement the linear function as a formula.

39. The system of claim 37 wherein:
   a. the computer comprises a look-up table; and
   b. the look-up table comprises precalculated indicia of the linear function.

40. The system of claim 39 wherein the look-up table provides precalculated indicia of the linear function as indexed by the amplitude difference.

41. The system of claim 39 wherein the look-up table comprises:
   a. first precalculated indicia of the linear function in accordance with a first slope, the first slope being in accordance with a first elevation angle; and
   b. second precalculated indicia of the linear function in accordance with a second slope, the second slope being in accordance with a second elevation angle.

42. The system of claim 37 wherein;
   a. the computer comprises indicia of a multiplicity of slopes for determining the bearing; and
   b. the computer is responsive to an input of the system to operate with a designated plurality of slopes of the multiplicity.

43. The system of claim 42 wherein the computer is responsive to the input from time to time during operation of the system.

44. The system of claim 42 wherein the designated plurality comprises indicia of slope in accordance with an elevation angle of horizon.

45. A computer for use in aircraft, the computer comprising:
   a. at least one input for accepting antenna signals; and
   b. a memory comprising idicia of:
      (1) a linear function having a slope; and
      (2) instruction for determining a bearing, the instructions comprising:
         determining an amplitude difference between a selected pair of the antenna signals;
         determining a slope in accordance with indicia of a selected antenna signal of the pair of antenna signals; and
         determining a bearing in accordance with the linear function, the amplitude difference, and the slope.

46. The computer of claim 45 wherein the step of determining a bearing further comprises determining the bearing in accordance with instructions that implement the linear function as a formula.

47. The computer of claim 45 wherein;
   a. the memory further includes a look-up table; and
   b. the step of determining the slope further comprises accessing the look-up table in accordance with indicia of the selected antenna signal.

48. The computer of claim 47 wherein the look-up table provides precalculated indicia of the linear function as indexed by the amplitude difference.

49. The computer of claim 47 wherein:
   a the memory further comprises indicia of a plurality of slopes for determining the bearing; and
   b. the computer is responsive to a second input to operate with a designated slope.

50. The computer of claim 49 wherein the computer is responsive to the second input upon association of the system with a particular fuselage.

51. The computer of claim 49 wherein the computer is responsive to the second input from time to time during operation of the system.

52. The computer of claim 49 wherein the indicia of the plurality of slopes comprises precalculated indicia of the linear function employing each slope of the plurality.

53. The computer of claim 47 wherein:
   a. each antenna signal of the pair is associated with a respective antenna having a respective orientation; and
   b. the look-up table provides precalculated indicia of the linear function as indexed by indicia of the respective orientation of each antenna associated with the pair of antenna signals.

54. The computer of claim 45 wherein:
   a. the memory further comprises indicia of a multiplicity of slopes, each slope for determining the bearing; and
   b. the computer is responsive to a second input to operate with a designated plurality of slopes of the multiplicity.

55. The computer of claim 54 wherein the computer is responsive to the second input upon association of the system with a particular fuselage.

56. The computer of claim 54 wherein the computer is responsive to the second input from time to time during operation of the system.

57. The computer of claim 54 wherein the designated plurality comprises indicia of slope in accordance with an elevation angle of horizon.

* * * * *